J. CHAMBERS.
Seed-Planter.
No. 63,018.
Patented Mar. 19, 1867.
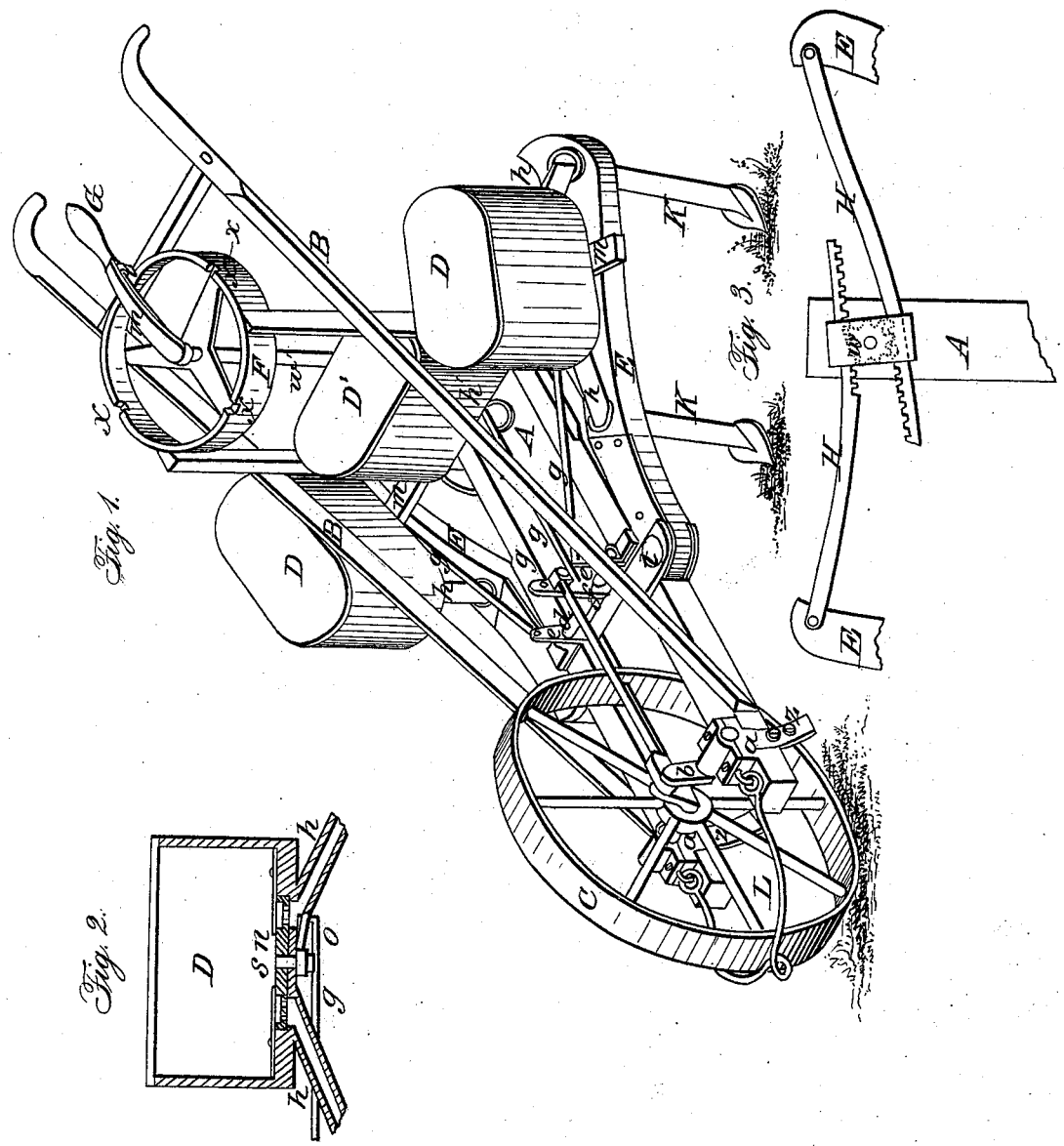

United States Patent Office.

JAMES CHAMBERS, OF GREENSBURG, INDIANA.

*Letters Patent No. 63,018, dated March 19, 1867.*

IMPROVEMENT IN SEED DRILLS.

The Schedule referred to in these Letters Patent and making part of the same.

TO ALL WHOM IT MAY CONCERN:

Be it known that I, JAMES CHAMBERS, of Greensburg, in the county of Decatur, and State of Indiana, have invented certain new and useful improvements in "Seed Drills," and do hereby declare that the following is a full, clear, and exact description of the same, reference being had to the accompanying drawings, and the letters of reference marked thereon, making a part of this specification.

In the annexed drawings, A represents the frame of the seed drill. This frame is open at the forward end, between which is placed the driving-wheel C. The wheel is provided with suitable journals, which rest within the bearings $a$ $a$, and with a crank, $b$. This bearings $a$ $a$ are so constructed that they may be elevated or lowered (see extended plates $z$ $z$) to regulate the height of the wheel C. E E represent two eccentric-shaped adjustable arms, which are pivoted, $t$, to the frame A. These arms are made of wood and connected to each side of frame A in a horizontal manner, and have each a hopper, D, and two seed spouts K K. It will be seen that the arms E E are straight for about one-third of their lengths, when they are curved so as to diverge from the frame A for the purpose of separating the seed spouts K K. At the rear of these arms, and on their under sides, are two metal rack-bars, H H, fig. 3, which are connected to the rear end of frame A by their cogs meshing into a cog-wheel, $w$, on said frame. Extending from this cog to the top of the drill, and up between the handles B B, is cog-shaft $w'$. This cog-shaft is enclosed by a metallic band, F, which is provided with four or more notches $x$ $x$, into which catch a portion of the handle G, which operates the cog-shaft, cog-wheel, and rack-bars H H for separating the arms from the frame or bringing the said arms nearer to the frame, as desired. When the arms are separated from or brought near to the frame A they are held in that position by a spring, $n$, on the top of the handle G, which keeps the handle in one of the notches $x$ and prevents the rack-bars from closing or separating.

This drill is provided with three hoppers, which may be of metal, and having suitable lids or coverings. One of these hoppers is placed upon each of the arms, while the other is placed on the frame A and between the arms. They are all provided with small openings and small circular perforated wheels, $s$, fig. 2, which lie horizontally in the bottom of the hoppers and connected to a shank, $r$, which passes through the wheels of each and operated by the small crank $o$. The hoppers D D, which are upon the arms E E, have two hollow tubes, $h$ $h$, upon which they rest, and which lead from said hopper to the seed pipes $k$ $k$. These tubes $h$ $h$ are open at the top and form coverings for the seed pipes $k$, as well as being supports for the hopper. The hopper D' upon the frame A has a pipe, $h'$, which leads directly to the seed pipe itself. $d$ represents a rock-shaft, which lies horizontally upon the frame A a short distance back of the wheel C. This shaft has three small uprights connected to it, $e, f$, and $e$, to which are attached the three rods $g$ $g$ $g$, which are secured to the small cranks $o$ under each hopper. $c$ represents the pitman, which is attached by means of a hook to the crank $b$ at the driving-wheel, and extends to the upright $f$ on the rock-shaft. It will be seen that the revolutions of wheel C operate the rock-shaft, which, by means of the rods $g$ $g$ $g$, turns the perforated wheels $s$ in the bottoms of the hoppers. L represents a clevis, to which the horse or other power is applied in the operation of seeding. The hoppers are filled with seed and the seed pipes placed the required distance to suit the rows in which the seed are to be dropped. The device is then drawn forward, when the pitman operating the rock-shaft, its uprights, and the rods $g$ $g$ $g$, causes the oscillation of the perforated wheels and regulates the quantity of seed planted. It will be observed that there is a curved horizontal brace, $m$, which is secured to the rear end of the frame A, and passes through suitable keepers on the arms E E, for assisting the connection of the said arms to the frame. In the centre upright of the rock-shaft there is a small hole, $y$, by which to regulate the feed. In a large-sized machine there is a slot made, instead of the hole herein shown; also, in the annexed drawings the forward end of the pitman $c$, where it is connected to the crank $b$, is closed; but in a large or full-size machine I use an ordinary hook, so that the pitman can be readily unshipped and the seeding immediately stopped when in operation

Having thus fully described my invention, what I claim as new, and desire to secure by Letters Patent, is—

1. The arms E E, made in the form described and connected to the frame A in the manner and for the purposes herein specified.

2. The arrangement of the frame A, with the driving-wheel C, hoppers D D and D', arms E E, pipes $h\ h$, and seed pipes K K, substantially in the manner and for the purposes herein set forth.

3. The adjustable journal boxes $a\ a$, when used as and for the purposes specified.

4. The rock-shaft $d$, provided with the uprights $e\ f\ e$, and operating the three perforated wheels $s$ by means of their rods $g\ g\ g$, in the manner and for the purposes set forth.

5. The arrangement of the rack-bars H H with the cog-wheel $w$ and cog-shaft $w'$, metallic band F, handle G, with spring $n$, for expanding or contracting the arms E E, with their attachments, in the manner as and for the purposes specified.

6. The hoppers D D, when used with their open tubes $h\ h$ and seed pipes K K, substantially as set forth.

In witness that I claim the foregoing I have hereunto set my hand in the presence of witnesses.

JAMES CHAMBERS.

Witnesses:
 WILL CUMBACK,
 JOSHUA POOL.